(12) United States Patent
Byrd (10) Patent No.: US 11,059,508 B1
(45) Date of Patent: Jul. 13, 2021

(54) SHOPPING CART ASSIST HANDLES (71) Applicant: Ernie Paul Byrd, Victoria, TX (US)

(72) Inventor: Ernie Paul Byrd, Victoria, TX (US)

( * ) Notice: Subject to any disclaimer, the term of this patent is extended or adjusted under 35 U.S.C. 154(b) by 0 days.

(21) Appl. No.: 16/927,962

(22) Filed: Jul. 13, 2020

(51) Int. Cl.
B62B 5/06 (2006.01)

(52) U.S. Cl.
CPC .............. B62B 5/065 (2013.01); B62B 5/069 (2013.01)

(58) Field of Classification Search
CPC ........... B62B 5/065; B62B 5/069; B62B 5/06; B62B 5/064
See application file for complete search history.

(56) References Cited

U.S. PATENT DOCUMENTS 7,290,776 B2 * 11/2007 Pascznk .................... B62B 5/06
280/47.371
8,844,948 B1 * 9/2014 Tanner ..................... A63C 3/04
280/33.992
8,931,744 B1 * 1/2015 McLafferty ............... B62B 5/06
248/118

* cited by examiner

Primary Examiner — John D Walters
(74) Attorney, Agent, or Firm — Karen B. Tripp (57) ABSTRACT Auxiliary handles for attachment to a shopping cart to serve as supports for persons with limited mobility or who tire easily while shopping. The handles are used in pairs, with each handle having a generally vertical or upwardly directed telescopically extendable upper tubular member extendable from a lower tubular member, rigidly attachable to a structural supporting member on the shopping cart. This upper tubular member is topped with a horizontal tube that extends over the back of the cart and also in an outwardly direction past the back of the cart so as to serve as an armrest or handrest for the user as the user walks along behind the cart, pushing the cart while shopping. The user can lean on the handles to ease his or her weight on his or her knees, legs, ankles, and back, to make use of the cart and shopping less tiresome.

11 Claims, 7 Drawing Sheets

SHOPPING CART ASSIST HANDLES

BACKGROUND OF THE INVENTION

1. Field of the Invention

The present invention relates to a shopping cart attachment, and more particularly, to apparatuses for connection to a conventional shopping cart to enable the cart to provide support to users with limited mobility or who tire easily so that such users can be more comfortable while shopping and can more easily shop.

2. Description of Relevant Art

Handling everyday shopping tasks such as pushing a shopping cart in a store can be challenging to persons who tire easily due to physical disorders or who have limited mobility but still prefer to do their own shopping. For example, persons with disorders such as COPD and/or obesity and/or advanced age, and persons recovering from injuries or surgeries involving their ankles, legs, or knees, may have difficulty standing and pushing a shopping cart throughout a large grocery or department store, but they nevertheless generally view themselves as relatively mobile and independent and want to do their own shopping, preferably standing up without help from others.

Some stores provide battery operated or electric shopping carts or shopping carts with small baskets for enhanced maneuverability that the elderly and physically handicapped can use in an effort to facilitate their shopping. While helpful, these solutions have drawbacks. Battery operated or electric carts, for seated shoppers, place the shoppers in a position too low to reach a number of shelves without getting out of the cart. And smaller, more maneuverable carts hold less and still require pushing like other carts. Small shopping carts that can be pulled are disfavored because pushing generally takes less effort than pulling as body weight is typically used to assist the exertion of pushing. Also, pulling a cart can result in the cart running into a user's shins or ankles.

A need continues to exist for an economical shopping cart and/or effective shopping cart solutions that provide support or assistance to a user with limited mobility or who tires easily that still allows the user to stand when shopping and participate in a shopping experience essentially like other shoppers.

SUMMARY OF THE INVENTION

The present invention provides auxiliary handles to be attached to a shopping cart in pairs to serve as support for persons with limited mobility or who tire easily while shopping. The handles each comprise a telescopically extendable and generally vertical upper tubular member, within a generally vertical lower tubular member, and connected to a horizontal tube that can serve as a forearm rest, an elbow rest, and/or a hand-hold on the cart for the user. The handle generally has a "T" shape although the base of the "T," that is, the extendable upper tubular member (and the lower tubular member), can have a slight slant off of vertical.

In use, the extendable tubular member is (or has already been) adjusted in length so that the user's forearm can rest comfortably on the horizontal tube when the extendable tubular member and/or the lower tubular member are attached to a structural supporting member of the shopping cart at or near the rear of the shopping cart. In position on the cart, the horizontal tube portion of the handle extends outward beyond the back of the cart and extends forward partially over and above the cart and the handle overall extends at least in part above a back wheel of the cart so that when a person's weight is placed on the horizontal tube while leaning on or pushing the cart, that weight is supported by the cart and the cart does not tip or turn under said weight.

BRIEF DESCRIPTION OF THE DRAWINGS

The present invention will be better understood by referring to the following detailed description of preferred embodiments and the drawings referenced therein, in which.

DETAILED DESCRIPTION OF PREFERRED EMBODIMENTS OF THE INVENTION

The present invention provides an adjustable apparatus that attaches to a shopping cart. The apparatus serves as an armrest and weight support for the user of the cart. The user can rest his or her hands or forearms on the apparatus and lean on the apparatus to balance and/or to relieve some of his or her weight on his or her ankles, legs, knees and even back while standing. In this manner, the user can improve his or her mobility and comfort while shopping, while being able to shop while standing and pushing the cart along at his or her desired pace.

The apparatus of the invention comprises a pair of handles, which are identical in configuration and are not connected one to the other, but are together as a pair in comprising the invention because their effectiveness for the armrest-type purpose described above is best achieved when the handles are used together as a pair, one handle on each side of the cart.

For utility, the handles attach to a shopping cart so as not to interfere with the operation of the cart or with the nesting of the cart (where carts are nestable) or even with the typical handle already on the cart. The handles of the invention can be used for steering the cart if desired without need for (and without interference with) use of the typical handle 29 already on the cart 11. In another embodiment of the invention, the handles of the invention could be manufactured with and as part of the cart. However, in the simplest form of the invention, the handles are an auxiliary apparatus (or apparatuses) for retrofitting onto shopping carts.

As shown in the Figures, a pair of handles 10 of one embodiment of the invention attach to a standard or typical shopping cart 11. A U-bolt clamp 12 may be used to effect such attachment although other means for attachment could be alternatively used. Strap 13 aids the attachment. Any other connector, preferably removable, that can effect the attachment could alternatively be used. Most preferably, the handles 10 are attached to the shopping cart 11 at or near the back corners of the cart 11, and are attached preferably to a structural support member 22 of the cart. That is, a standard shopping cart 11 as shown in the Figures has a front 14, left side 17, right side 18, back 20, basket bottom 21, a base 24, and rear wheels 27 and front wheels 28 positioned so that there is one wheel at each corner of the base 24 of the cart.

In a preferred embodiment, each handle 10 is attached to a structural support member 22 of the cart, with one handle 10 on each side (17, 18) of the cart 11, near the back 20 of the cart 11 and above each rear wheel 27 of the cart 11. In the Figures shown, the structural support member 22 of the cart slopes at a diagonal at the rear or back of the cart 10 and outside the basket 30. However, in an alternative embodiment, the structural support member 22 of the cart can be more vertical and positioned at or against the back corners of the cart.

With attachment to the cart 11, the handle 10 is generally positioned in a direction above a rear wheel 27 of the cart such that when the handle is in use as a support or armrest for the user of the cart 11, the user can exert a substantial amount of force on the handle 10 by leaning his or her weight on the handle 10 without causing the cart 11 to tip or leverage backwards. A pair of handles 10, one on each side of the cart 11 as shown in the Figures, allows the handles 10 and the cart 11 to bear more weight from the user and for the cart 11 to retain balance and avoid tipping.

Preferably, each of the handles 10 when attached to a structural support member 22 is outside the basket 30 of the cart 11, as shown in the Figures. Such positioning of the handles 10 allows the cart 11 to be nested with other carts 11. That is, such positioning of the handles 10 outside basket 30 allows utility of the handles 10 without interference with usual use and function of cart 11.

Each handle 10 of the invention is comprised of a telescopically extendable upper tubular member 16 extending from a lower tubular member 15, both of which are preferably comprised of a strong metal, metal alloy, or synthetic material that is rigid and rigidly attachable to the cart 11, or preferably and more specifically to a structural supporting member 22 on the side of and near the back 20 of the cart 11. The telescopically extendable feature or aspect of the upper and lower tubular members 16 and 15 respectively allows handle 10 to be easily adjustable so that the height of the handle can be extended, lengthened, raised or reduced, shortened or lowered, as desired to place the handle at a comfortable level for a user to rest his or her hand and/or forearm on the handle 10. Such adjustability is desirable because the users will be upright and walking and their height will vary from user to user resulting in turn for a need for the handles to be at different heights for different users. In one embodiment, the extendable upper tubular member 16 and the lower tubular member 15 from which the extendable upper tubular member 16 extends, together range, for example, from about two feet to about four feet in length, allowing generally for ease of use by persons ranging in height from about four and one half feet to about six and one-half feet.

A locking mechanism 32 holds the extendable upper tubular member 16 at the desired height/length within tubular member 15. In one embodiment the locking mechanism allows for continuous position settings whereas in an alternative embodiment the locking mechanism allows for incremental position settings. Example locking mechanisms that can be used with the handles of the invention include without limitation push-button latches, wing-bolt collars, and lever clamps.

The extendable upper tubular member 16 is connected at its top end 33 to a horizontal tube 26 which may be comprised of the same material as the extendable tubular member. When the extendable upper tubular member 16 and the horizontal tube 26 are comprised of a metal such as for example steel or aluminum, such connection can be made by welding. When the extendable upper tubular member 16 and the horizontal tube 26 are comprised of a rigid synthetic material such as a nylon or hard plastic, such connection can be made by hot melting. Preferably, the connection point is about the lengthwise middle of the horizontal tube 26. Once connected, extendable upper tubular member 16 and horizontal tube 26 generally have a "T" shape, although the extendable upper tubular member 16 and lower tubular member 15 can be slanted off of vertical somewhat, generally at an angle no greater than about sixty degrees, to better align with the angle of the structural support member 22 of the cart 11. When the handle 10 is positioned on the cart 11, and the lower tubular member 15 is attached to that structural support member 22, the horizontal tube 26 is raised above basket 30 of the cart 11 and has its forward half extending over and above the rear portion of the basket 30 and has its aft half extending at (and above) the rear of the cart 11 in an outward direction away from the basket 30.

Figure 1:
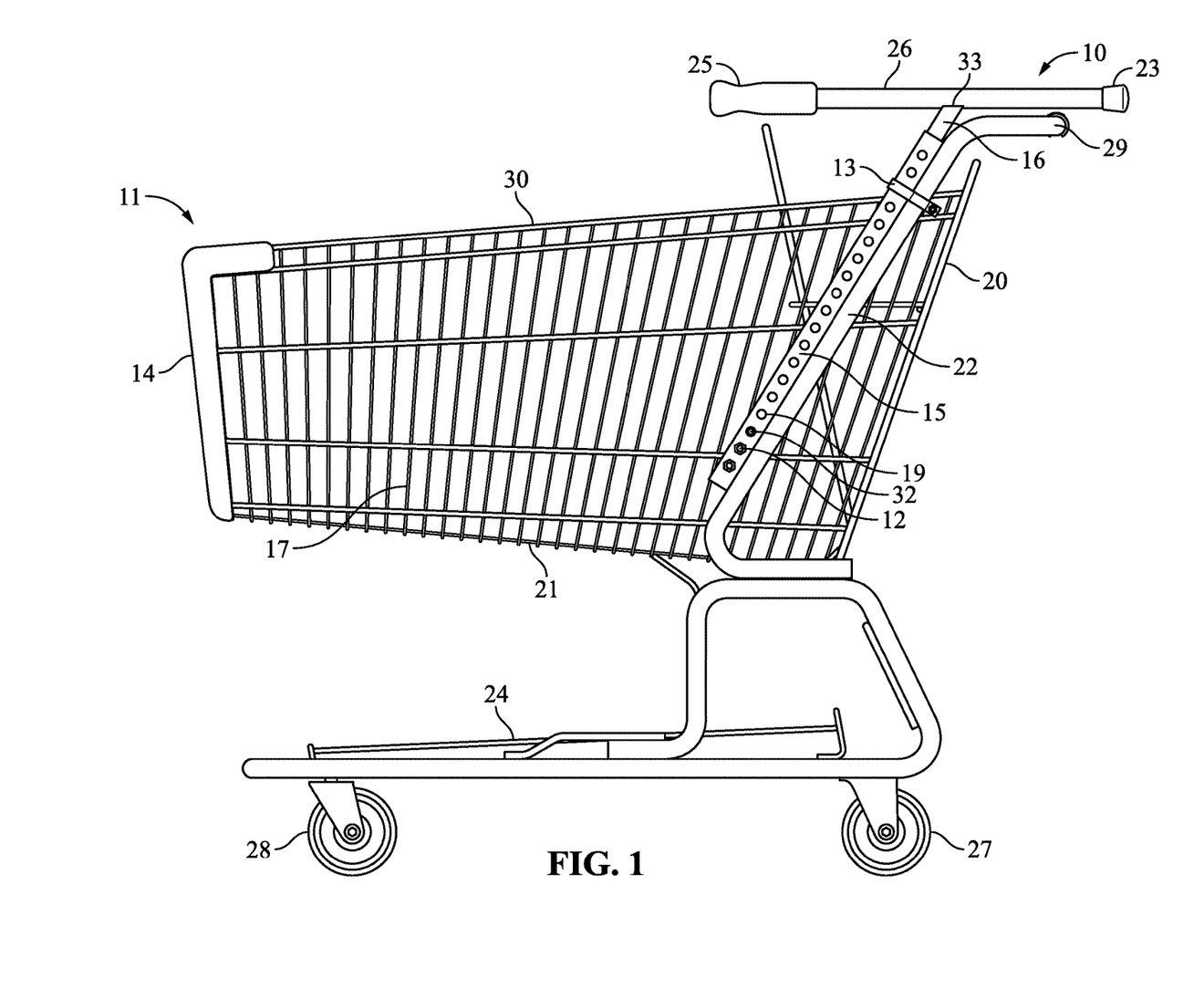
FIG. 1 is a side view of one embodiment of the handles of the invention installed on or attached to a standard shopping cart.
Figure 2:
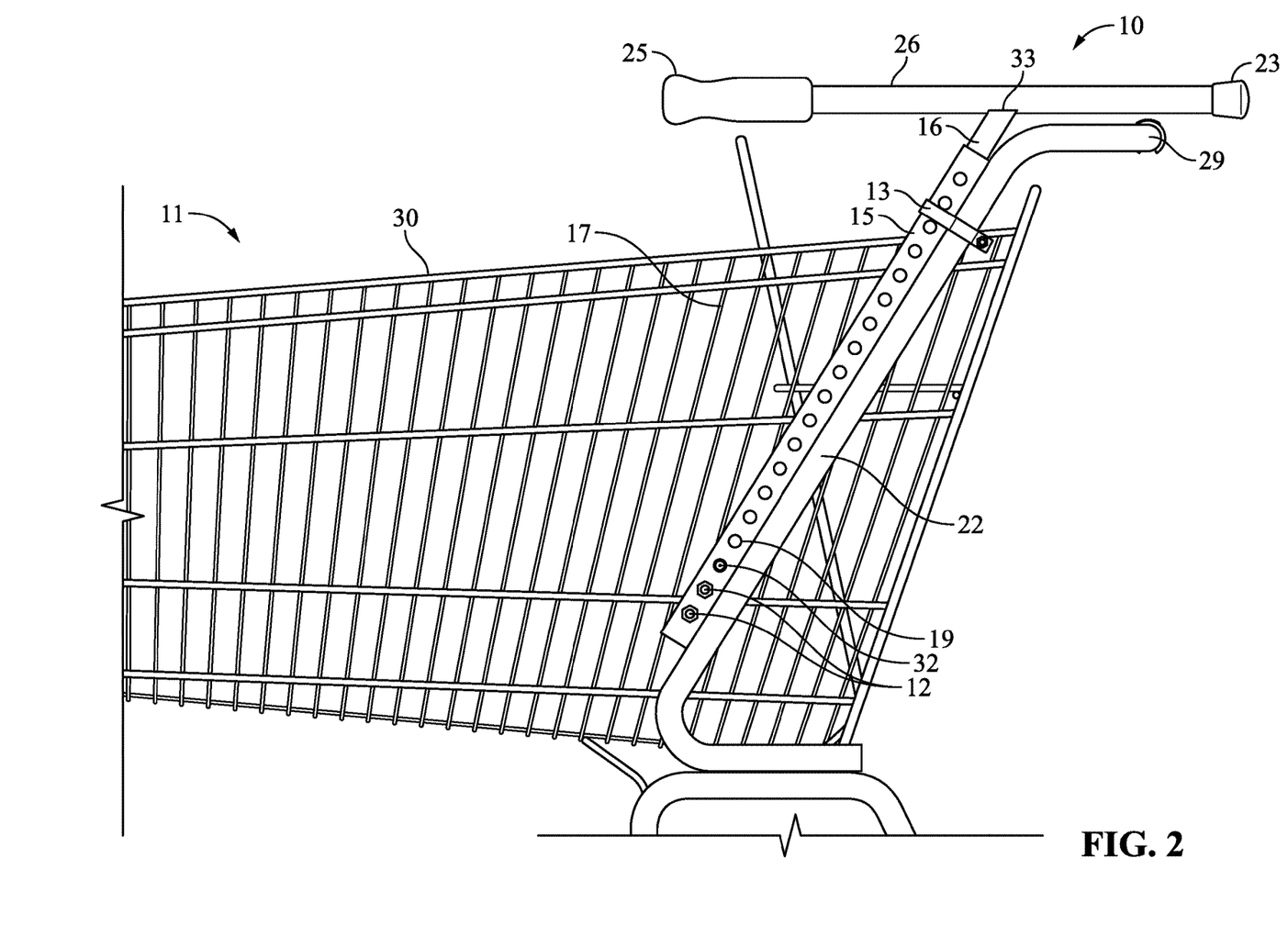
FIG. 2 is a close-up view of the handles of FIG. 1.
Figure 3:
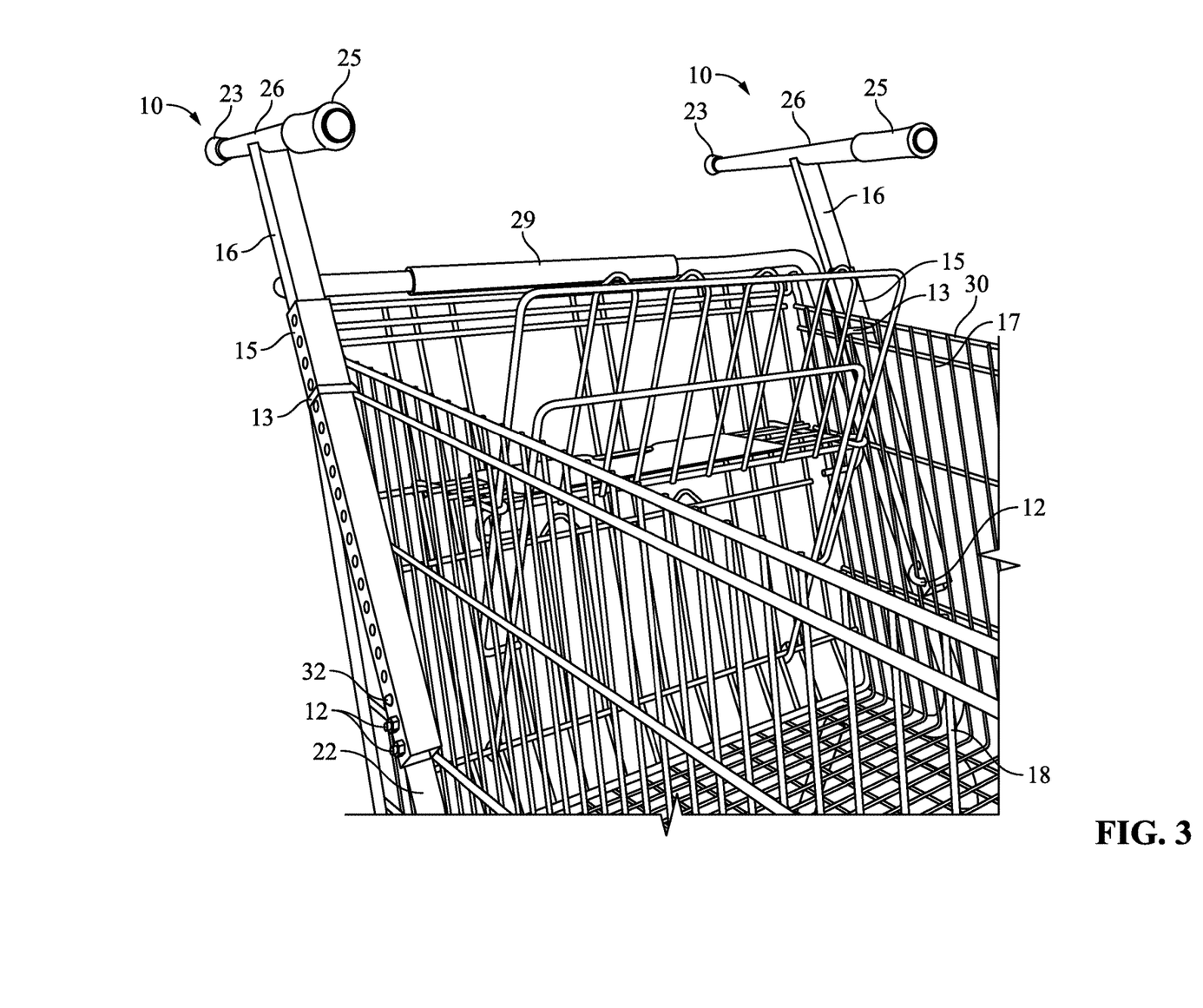
FIG. 3 is a front perspective view of the handles of FIG. 1.
Figure 4:
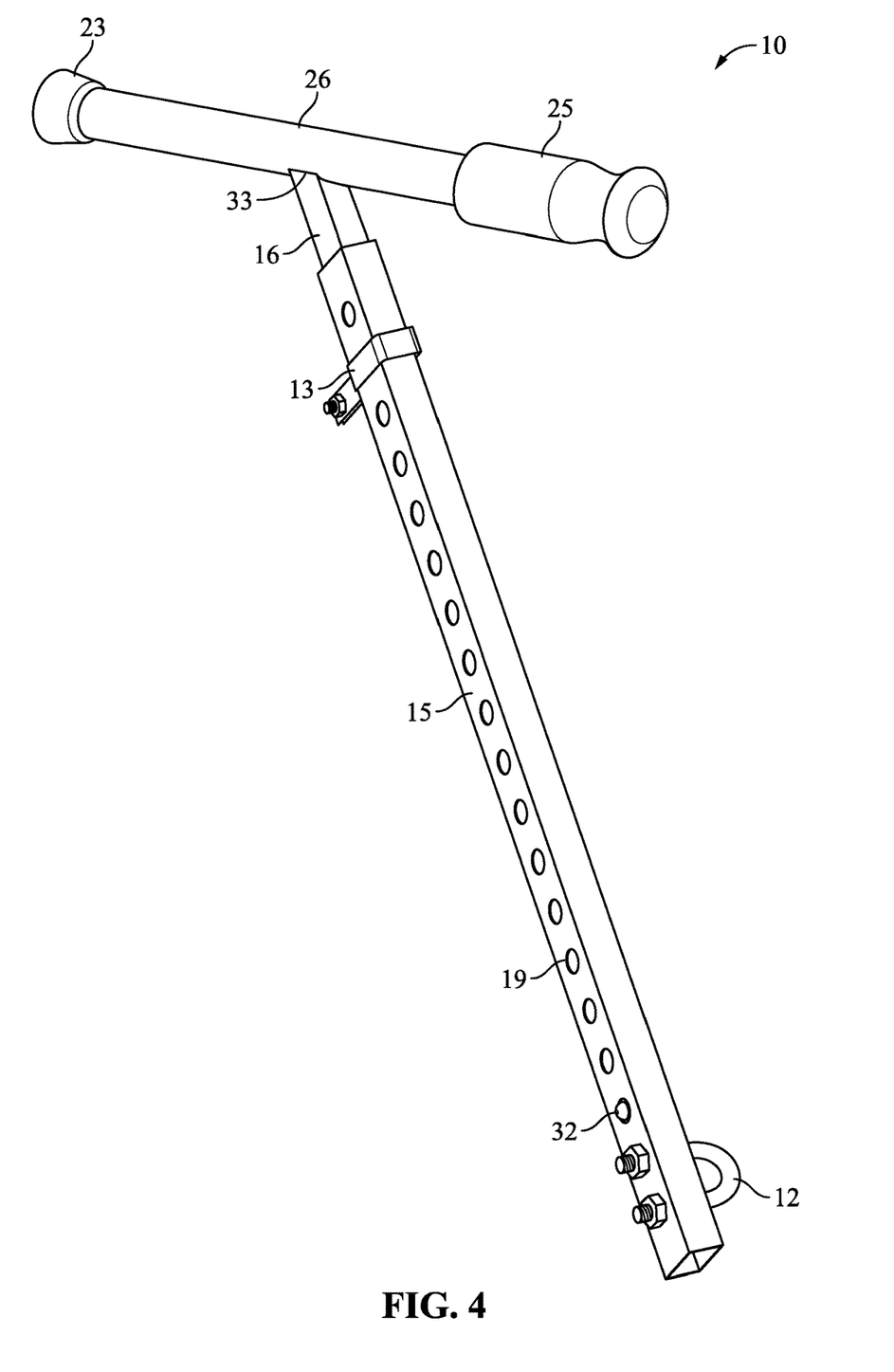
FIG. 4 is a close-up side perspective view of the handles of FIG. 1.
Figure 5:
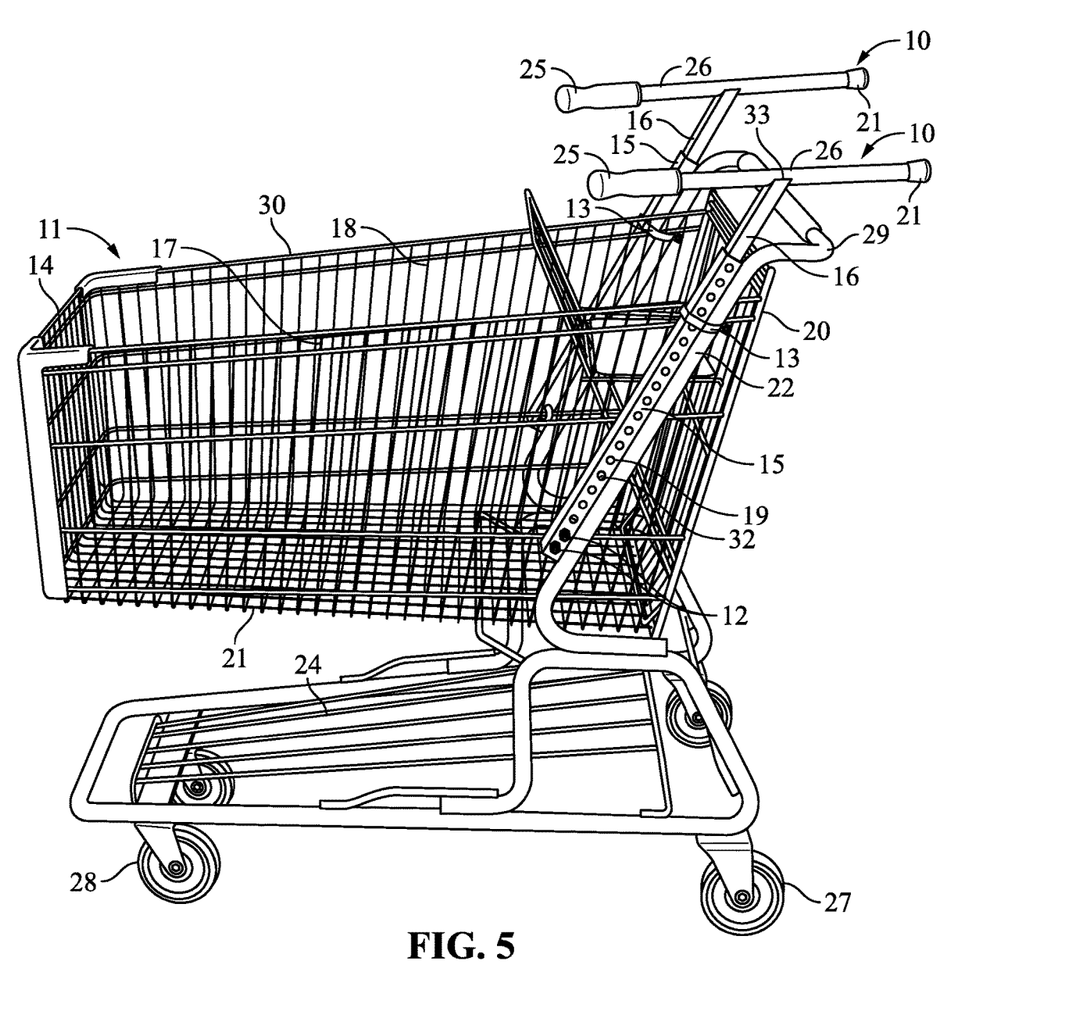
FIG. 5 is a side perspective view of the handles of FIG. 1 installed on or attached to a standard shopping cart.
Figure 6:
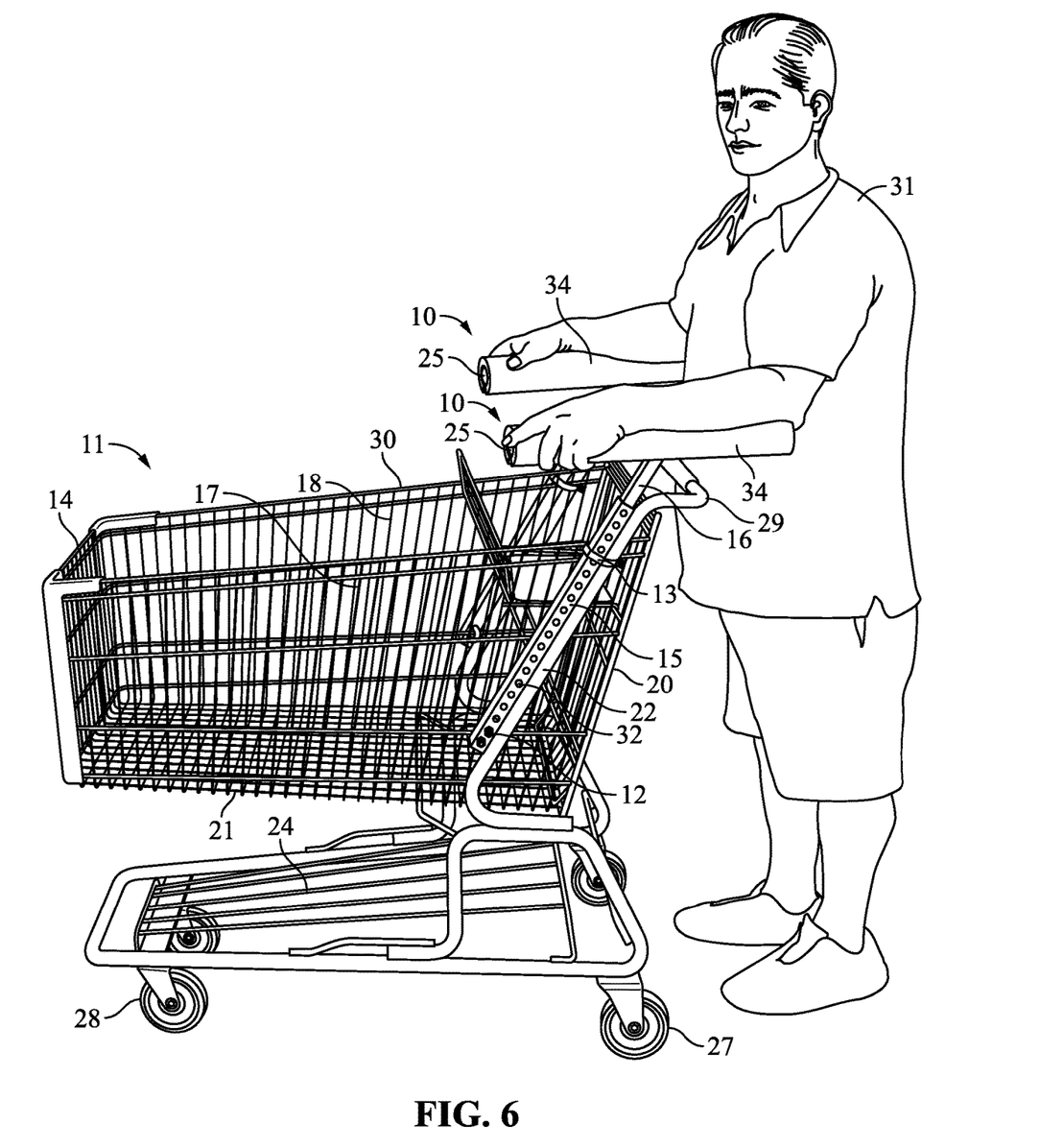
FIG. 6 is a side perspective view of an alternative embodiment of the handles of the invention, having padding, and installed on or attached to a standard shopping cart, shown in use.
Figure 7:
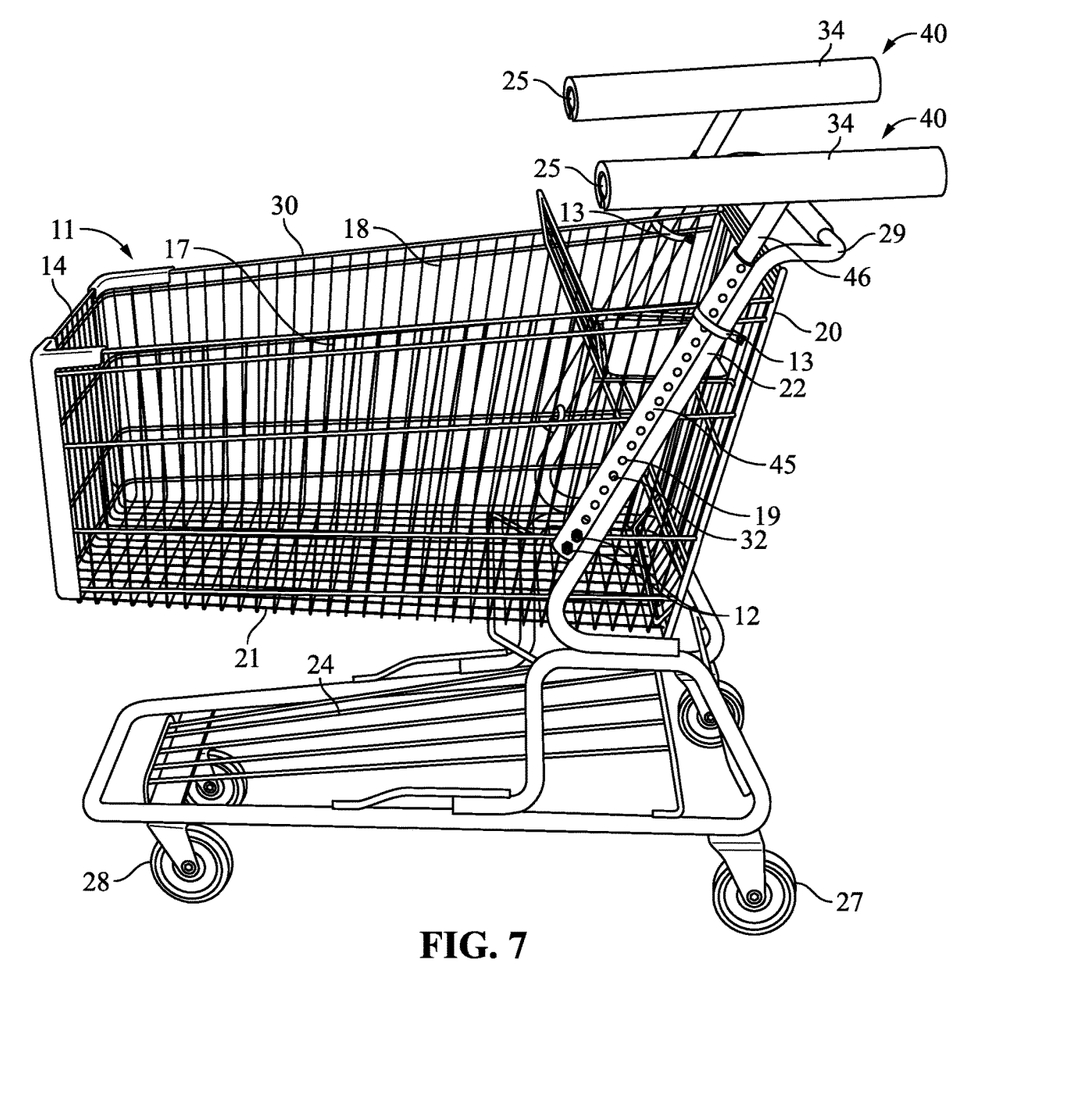
FIG. 7 is a side perspective view a third alternative embodiment of the handles of the invention installed on or attached to a standard shopping cart, wherein all of the tubing comprising the handles is a round-type and the handles have padding.

Horizontal tube 26 is the armrest portion of handle 10 and to make it more comfortable for the user, it can have a rubber tip 23 and end piece 25 as shown in the embodiment in FIGS. 1-5, or it can have padding 32 as shown in the embodiments in FIGS. 6-7. The padding can be comprised of disposable foam, for example, or a material that is easy to clean and disinfect. As shown in FIG. 6, a typical user may rest his or her forearms on horizontal tube 26 thereby reducing some of his or her weight on his or her lower extremities and back. The handles 10 are oriented on the cart 11 as shown so the user can effortlessly steer the cart and basket while staying engaged with the armrest portion (horizontal tube 26) of the handles. In addition to serving as an armrest, horizontal tube 26 and also be an elbow rest, and the portion of horizontal tube 26 above or near handle 29 of the cart 11 can also especially serve as a hand-hold or place for the user to rest his or her hand or even hold or grab or direct cart 11.

In the embodiments of the invention shown in FIGS. 1-6, the lower tubular member 15 and the extendable upper tubular member 16 are comprised of square tubing and the horizontal tube 26 is comprised of round tubing. Such tubing design or style is illustrative, and round tubing for lower tubular member 15 and extendable upper tubular member 16 could easily be substituted for the square tubing, as shown in FIG. 7, without departing from the design or utility of the invention. In some uses, round tubing for lower tubular member 15 and extendable upper tubular member 16 can afford faster or easier height adjustment than square tubing. However, all teachings herein directed to the embodiments shown comprising square tubing are applicable to embodiments with all round tubing.

While preferred embodiments of the present disclosure have been described, it should be understood that other various changes, adaptations, and modifications can be made therein without departing from the spirit of the invention(s) and the scope of the appended claims. The scope of the present disclosure should, therefore, be determined not with reference to the above description, but instead should be determined with reference to the appended claims along with their full scope of equivalents. Furthermore, it should be understood that the appended claims do not necessarily comprise the broadest scope of the invention(s) that the applicant is entitled to claim, or the only manner(s) in which the invention(s) may be claimed.

What is claimed is:

1. A pair of auxiliary handles for attachment to a shopping cart to serve as supports for persons with limited mobility or who tire easily while shopping, wherein the shopping cart comprises a front, back, a first side, and a second side, at least one underlying front wheel, at least one structural supporting member on said first side at or near the back of said cart and has at least one corresponding structural supporting member on said second side at or near the back of said cart, an underlying first back wheel near said first side, and an underlying second back wheel near said second side, each said handle comprising:
- a telescopically extendable upper tubular member within and extendable from a lower tubular member rigidly attachable to said at least one structural supporting member on said first side or said second side of said shopping cart such that said lower tubular member and said extendable upper tubular member are positioned in a vertical, near vertical or diagonal position and said extendable upper tubular member has a top end extending above the cart;
- a locking mechanism for holding the lower tubular member at a specifically desired extension or height;
- a horizontal tube affixed to said top end of the extendable upper tubular member such that the horizontal tube with the extendable tubular member comprise a slanted "T" shape, and when the lower tubular member is attached to said cart, said horizontal tube extends outward beyond the back of the cart and extends forward partially over and above the cart and extends at least in part above the first back wheel or the second back wheel of the cart so that when a person's weight is placed on said horizontal tube while leaning on or pushing the cart that weight is supported by the cart and the cart does not tip or turn under said weight.

2. The handles of claim 1 wherein the horizontal tube of each handle is in part covered by a pad.

3. The handles of claim 2 wherein said pad is disposable.

4. The handles of claim 2 wherein said pad is cushioned.

5. The handles of claim 1 wherein the wherein installation of the handles on a shopping cart does not interfere with the nesting of the carts when the carts are otherwise already nestable.

6. The handles of claim 1 wherein said locking mechanism is comprised of a push-button latch.

7. The handles of claim 1 wherein said locking mechanism is comprised of a wing bolt collar.

8. The handles of claim 1 wherein said locking mechanism is comprised of a lever clamp.

9. The handles of claim 1 wherein the lower tubular member or the extendable upper tubular member is attachable to said at least one structural supporting member at or near the top of said structural supporting member and wherein the lower tubular member is attachable to said at least one structural supporting member at or near the bottom of said structural supporting member.

10. A method for assisting persons with limited mobility or in need of support in pushing a shopping cart comprising adapting said shopping cart by attaching the handles of claim 1 to the cart so that a person using the cart can rest their hands and/or forearms on said handles along with an amount of their weight on the handles as is comfortable or desirable to said person.

11. A shopping cart comprising the handles of claim 1.

* * * * *